Patented Aug. 4, 1925.

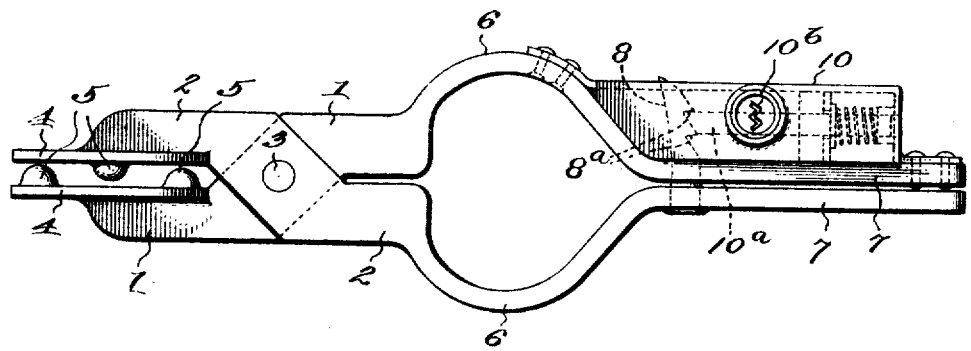
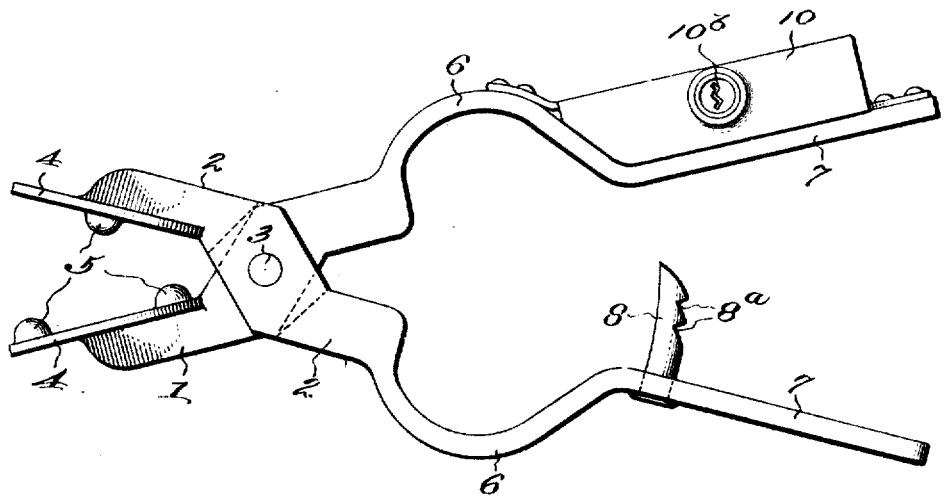

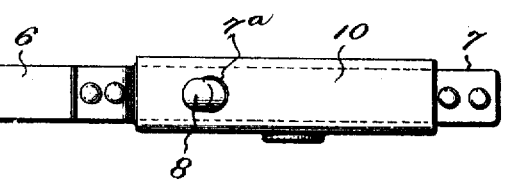
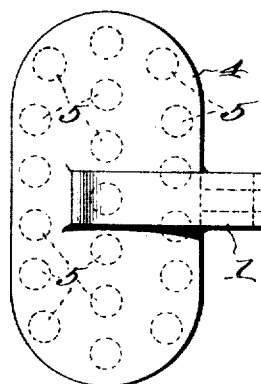
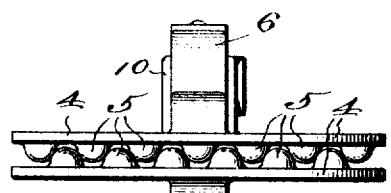
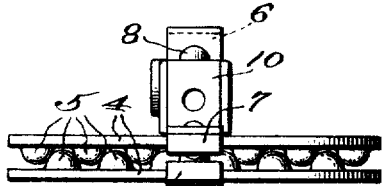
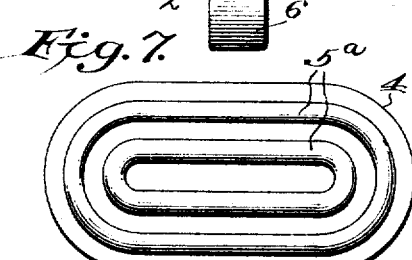
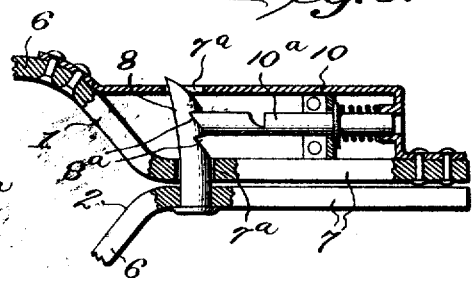
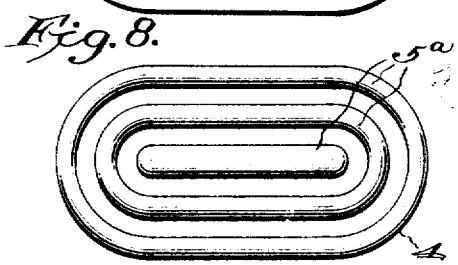

1,548,584

UNITED STATES PATENT OFFICE.

CHARLES DIETRICH, OF SHELLY, PENNSYLVANIA.

LAP-ROBE LOCK.

Application filed September 19, 1924. Serial No. 738,674.

*To all whom it may concern:*

Be it known that I, CHARLES DIETRICH, a citizen of the United States of America, and a resident of Shelly, county of Bucks, State of Pennsylvania, have invented certain new and useful Improvements in and Relating to Lap-Robe Locks, of which the following is a specification.

This invention relates to improvements in lap robe locks; and the nature and objects of the invention will be readily understood by those skilled in the art in the light of the following explanations of the accompanying drawings that illustrate what I now believe to be the preferred mechanical expression or embodiment of my invention from among other forms and constructions within the spirit and scope thereof.

An object of the invention is to provide means for retaining a lap robe or blanket against unauthorized removal from a vehicle, whether such means be employed to retain the robe on and protecting the radiator of a motor vehicle, or within the body of the vehicle, with the particular end in view of providing robe securing means, embodying an anchoring ring or collar capable of opening and closing and whereby the robe securing means can be locked or anchored to any one of several parts of a motor vehicle, such as a front cross bar or brace in advance of the radiator or at the front end of the chassis, the steering wheel, a foot rest, a robe hanger, and the radiator filling neck, among others.

With this and other objects in view, my invention consists in certain novel features of construction, and in combinations and arrangements as more fully and particularly set forth and specified hereinafter.

Referring to the accompanying drawings, forming part hereof:

Fig. 1 is a side elevation showing an embodiment of my robe securing device, in securing or locked condition.

Fig. 2, shows the device in partially opened position.

Fig. 3, is an edge elevation, dotted lines indicating one of various robe gripping jaw formations that can be employed.

Fig. 4, is an end elevation.

Fig. 5, is an elevation of the handle end of the device.

Fig. 6 is a diagrammatical detail sectional view.

Figs. 7 and 8 are face views of a circular lug or boss robe gripping jaw formation, showing complementary jaw faces, respectively.

In the particular example illustrated for purposes of explanation, the device embodies a pair of longitudinally-elongated approximately similar lever members or bars 1, 2, that are crossed, intermediate their lengths, and pivotally united in any suitable manner or by any suitable means, to open and close after the manner of tongs or pliers, although I do not wish to thus limit all features of my invention.

In the example shown, the members 1, and 2 are pivotally united by a cross or transverse pivot pin 3, extending through the reduced or rabbetted crossing portions of the members.

The free ends of the short arms of the lever members form, or are provided with, robe or blanket clamping and holding means, for instance, such as complementary opposing clamping jaws 4, at their adjoining or operative faces formed in any suitable manner or by any suitable means to grip or lock a robe against detachment without such mutilation or damage as to destroy its saleable value. For instance, in the example shown, the jaws 4 are of approximately flat plate form of more or less extensive area formed at their operative faces with a plurality of spaced projections, with the gripping projections of each jaw arranged to break, join, or be out of alinement with the projections of the opposing jaw. Thus when the jaws are in operative closed robe clamping position, the clamping projections of each jaw lie in the spaces between the projections of the other jaw, with the end in view of clamping a portion of the robe tightly between the jaws in such a manner that the opposing projections will lock the robe against being pulled from the jaws. While I do not wish to limit my invention to any particular clamping jaw formation, yet the forms shown do not damage the robe and are very effective.

The members 1, 2, are formed to provide an anchoring ring or collar by which the device can be secured or anchored to any suitable or appropriate part of a motor or other vehicle such as hereinbefore mentioned, while securely gripping and holding the robe against removal.

For instance, in the embodiment of my invention shown, the members 1, 2, are formed with complementary opposite approximately U shaped, or semi-circular, offsets or loops 6, which when the members are closed together in locked operative position, form the closed annular anchoring ring or collar which, of course, can be of any desired form or dimensions.

The free ends of the long arms of the lever members 1, 2, form long lever arm handles 7, by which the members can be grasped and pressed together with the desired force and power to tightly clamp the robe between the jaws, and close the anchoring collar, and a powerful leverage is thus attained for grasping the robe by closing the jaws. In this instance the handle forming ends 7 are straight and adapted to be brought together into parallelism when the members are closed together to their limits of closing movement, although I do not wish to so limit all features of my invention.

In the form shown the anchoring collar 6, is located between the lever handles 7, and the fulcrum or pivot of the crossed lever members and hence when said members are swung apart to separate their handle ends, the jaws are separated simultaneously with the opening of the anchoring collar, although I do not wish to so limit all features of my invention.

Any suitable mechanism or means is provided for locking the lever members and against separating swing and in closed operative position, and I preferably employ an automatic lock for this purpose. To this end, the lever handle 7 of the lever member 2 is formed with a lateral rigid projecting horn or keeper 8, formed with, preferably, several beveled-edge locking notches or teeth 8ª, arranged longitudinally thereof, and the opposing handle 7 of the lever member 1, is formed with transverse hole or perforation 7ª, for the passage of said horn or keeper, and is provided with any suitable lock mechanism 10 embodying a spring pressed locking bolt 10ª, formed to slip freely past the notches 8ª, as the lever handles swing toward each other and to automatically engage one of said notches and lock the handles against separating swing. This lock is operative to withdraw the bolt from the horn or keeper, and permit opening swing of the lever members 1, 2, by a special or distinctive key to be kept in the possession of an authorized person, such as the automobile operator, and insertable through key slot 10ᵇ, for instance. By thus providing several locking positions, robes of different thicknesses can be secured and also either a doubled or a single thickness of a robe can be clamped and the long lever arms enable the operator to easily apply the necessary power to compress the robe between the jaws to bring the handles as close together as possible and lock them by the bolt engaging one of the locking notches. The robe gripping faces of the clamping jaws 4, can be variously formed to avoid puncturing and other mutilation of the robs and yet to positively clamp the robes against unauthorized detachment. For instance, in Figs. 1, 2, 3, 4 and 5, I show the operative faces of the jaws formed with projections 5, as hereinbefore described, whereby the jaws in effect, interlock, when closed together, with respect to the robe clamped therebetween. In this form, the operative faces of the jaws present a multiplicity of spaced variously arranged projections in the form of knobs or bosses, arranged to break joints as described. In Figs. 7 and 8, which show in plan the operative faces of the two complementary jaws 4, the projections are in the form of spaced or concentric annular projecting ring-shaped flanges or knobs 5ª. The rings of one jaw close down between the rings of the other jaw to clamp the robe therebetween.

It is evident that various changes, modifications, and variations might be resorted to without departing from the spirit and scope of my invention, and hence I do not wish to limit myself to the exact disclosure hereof.

What I claim is:—

1. A robe lock comprising a pair of crossed pivotally connected elongated lever members at corresponding free ends provided with robe securing jaws, and at their opposite ends forming long arm lever handles, said members formed to provide an anchoring collar intermediate said jaws and said lever handles.

2. A robe lock comprising a pair of crossed pivotally connected elongated lever members at corresponding free ends provided with robe securing jaws and at their opposite ends forming long arm lever handles, automatic locking means carried by said lever handles, and the said lever handles formed intermediate said locking means and the pivotal point of the lever members with opposite anchorage collar forming loops.

In testimony whereof I have hereunto set my hand at Shelly, Pennsylvania, this 30th day of August, 1924.

CHARLES DIETRICH.